US005762044A

United States Patent [19]

Hollister et al.

[11] Patent Number: 5,762,044

[45] Date of Patent: Jun. 9, 1998

[54] THROTTLE VALVE RETURN MECHANISM FOR ENGINE THROTTLE VALVE

[75] Inventors: David B. Hollister, Plymouth; David E. Lightfoot, Highland; Thomas D. Wernholm, Northville; Catherine A. Gandolfo, Dearborn Heights, all of Mich.

[73] Assignee: Ford Motor Company, Dearborn, Mich.

[21] Appl. No.: 398,192

[22] Filed: Mar. 2, 1995

[51] Int. Cl.[6] .............................. F16K 1/22; F02B 77/08

[52] U.S. Cl. .............................................. 123/400; 251/313

[58] Field of Search .................................... 251/305, 306, 251/313; 123/400, 337

[56] References Cited

U.S. PATENT DOCUMENTS

| | | |
|---|---|---|
| 3,927,657 | 12/1975 | Mennesson . |
| 4,576,762 | 3/1986 | Griffin et al. . |
| 4,579,017 | 4/1986 | Nusser . |
| 4,582,653 | 4/1986 | Blanchard et al. . |
| 4,625,943 | 12/1986 | Groger . |
| 4,880,207 | 11/1989 | Matsumoto et al. . |
| 5,168,852 | 12/1992 | Moriguchi et al. . |
| 5,275,375 | 1/1994 | Semence ............................ 123/400 X |

FOREIGN PATENT DOCUMENTS

| | | |
|---|---|---|
| 2676250 | 11/1992 | France .................................. 123/337 |
| 572663 | 4/1989 | Japan . |
| 5946346 | 4/1989 | Japan . |
| 60195939 | 4/1989 | Japan . |
| 6057751 | 4/1989 | Japan . |

*Primary Examiner*—Denise L. Ferensic
*Attorney, Agent, or Firm*—David B. Kelley

[57] ABSTRACT

A throttle valve for an air intake manifold of an internal combustion engine has a throttle barrel attached to the intake manifold, a valve plate rotatably mounted on a shaft therein, and a barrel outer half bushing integral with the throttle barrel. Connected to the shaft outside the throttle barrel is a throttle cam having an inner spring bushing integrally attached thereto and concentric with the shaft, as well as a cam outer half bushing, also integrally attached to the throttle cam and coaxially aligned with the barrel outer half bushing and which combines therewith to form an outer bushing. An outer return spring is mounted around an outer surface of the outer bushing with a first end positioned on a land stationary relative to the barrel and a second end mounted to a spring hook on the throttle cam. An inner return spring is mounted between the inner bushing and the outer bushing, likewise with a first inner spring end positioned in the slit and a second inner spring end mounted to the spring hook. An accelerator cable is attached to the throttle cam for rotating it, and thus the valve plate, to a desired position.

16 Claims, 3 Drawing Sheets

THROTTLE VALVE RETURN MECHANISM FOR ENGINE THROTTLE VALVE

FIELD OF THE INVENTION

The present invention relates to throttle valves for internal combustion engines, and, more particularly, to a throttle valve return mechanism which minimizes friction between the return springs and the bushings.

BACKGROUND OF THE INVENTION

Air is typically metered into an internal combustion engine by a throttle valve attached to the intake manifold. The position of the throttle valve is usually controlled by a driver operated accelerator pedal attached by a cable to a throttle lever. The throttle lever is connected to a shaft which rotates a plate within a throttle barrel between a shut position, in which little or no air is allowed into the intake manifold, and various open positions from slightly open to full open throttle. Engine speed is partially controlled by the throttle valve position, with higher speeds produced at full open throttle and low or idle speeds occurring with the throttle valve shut.

In many automotive applications, a spring connected between the throttle lever and the throttle barrel biases the valve to the shut position so that the engine idles when the accelerator pedal is released. A backup spring is conventionally mounted between the throttle cam and the throttle barrel. Such a configuration is shown in FIG. 10. A first spring 102 and a second spring 104 are concentrically mounted around shaft 106 between throttle lever 108 and throttle barrel 112. The springs 102, 104 ride on outer bushing 114 and inner bushing 116, respectively. The bushings 114 and 116 are mounted to shaft 106.

Ends 120, 122 of springs 102, 104 rotate with throttle lever 108 when the accelerator pedal (not shown) is depressed and little or no friction develops between the spring end 120, 122 and the races 114, 116, respectively. On the other hand, ends 124, 126 of springs 102, 104 are mounted to projection 128 on throttle barrel 112 and the races 114, 116 rotate therebeneath causing friction which can result in throttle valve hysteresis.

In addition to having excessive relative rotation between the return springs and the bushings, another undesirable characteristic of prior throttle return devices, such as those shown in U.S. Pat. No. 4,880,207 (Matsumoto et al) and Japanese Patents Sho 57[1982]-2663, 60[1985]-57751, 60[1985]-195939, and 59[1984]-46346, is difficulty in assembly due to the number of parts required, including an inner bushing, an outer bushing, an inner spring, and an outer spring. Some devices also utilize separate collars between the inner and outer bushings which require additional assembly time.

SUMMARY OF THE INVENTION

Responsive to the noted deficiencies in the related art, the present invention minimizes friction between the return springs of a throttle valve control mechanism while decreasing the number of separate parts required for assembly by providing bushings integral with the throttle lever, or throttle cam, and the throttle barrel. The throttle mechanism of the present invention has a throttle barrel attached to the engine intake manifold with a valve plate rotatably mounted on a shaft therein. A barrel outer half bushing is integrally formed with the throttle barrel and has a slit therein extending parallel to a central axis through the bushing. Connected to the shaft is a throttle cam having an inner spring bushing thereon concentric with the shaft, and having also a spring hook integrally formed therewith. A cam outer half bushing integral with the throttle cam is coaxially aligned with the barrel outer half bushing and combines therewith to form an outer bushing. Mounted around an outer surface of the outer bushing is an outer return spring having a first end positioned against a land on the throttle barrel and a second end mounted to the spring hook. An inner return spring is mounted between the inner bushing and the outer bushing and has a first end positioned through the slit and against the land, and a second end mounted to the spring hook. An accelerator cable or other such means are attached to the throttle cam for rotating it, and thus the valve plate, to a desired position.

Thus, an advantage of the present invention is a throttle return mechanism which minimizes relative motion and thus friction between the return springs and the bushings.

Another advantage is a throttle return mechanism which reduces hysteresis of a vehicle throttle valve to improve vehicle response to a desired operator input.

Still another advantage is that fewer parts are required to assemble the present invention.

A further advantage is a throttle return mechanism that is inexpensive to manufacture and easy to assemble.

A feature of the present invention is an inner bushing attached to the throttle cam and an outer bushing having a first member attached to the throttle cam and a second member attached to the throttle barrel.

Another feature is integral construction of the inner bushing and the outer bushing first half member with the throttle cam.

Still another feature of the present invention is integral construction of the outer bushing second half member with throttle barrel.

Another feature is a space between the outer bushing half members which eliminates friction therebetween.

BRIEF DESCRIPTION OF THE DRAWINGS

These and other objects, advantages and features of the present invention will be apparent to those skilled in the art upon reading the following description with reference to the accompanying drawings, in which.

DETAILED DESCRIPTION OF THE PREFERRED EMBODIMENT

Figure 1:
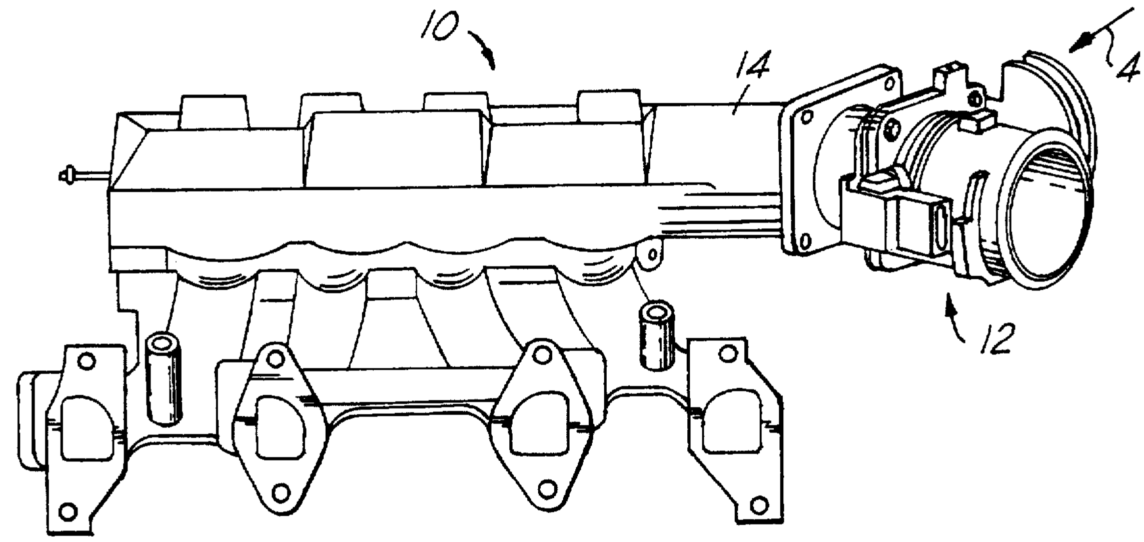
FIG. 1 is a perspective view of a throttle return mechanism according to the present invention shown attached to an intake manifold.

Referring now to FIG. 1 of the drawings, an internal combustion engine intake manifold, shown generally at 10, has a throttle valve 12 attached thereto at an intake pipe 14. As better seen in FIG. 2, the throttle valve 12 has a cylindrically shaped throttle barrel 16 with a flange 18 which connects to the intake pipe 14. A shaft 20 extends through the throttle barrel 16 perpendicular to the central axis 22 thereof. Mounted on shaft 20 is a valve plate 24 which can rotate to various positions so as to selectively meter air into intake manifold 10 by opening and closing the air path through the throttle barrel 16.

Figure 2:
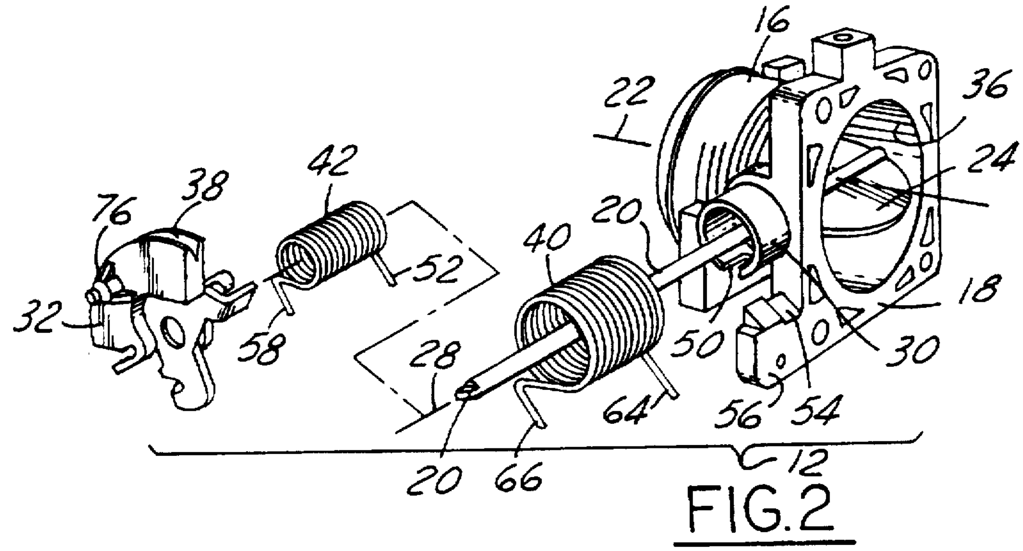
FIG. 2 is an exploded perspective view of a throttle return mechanism according to the present invention.

The shaft 20 is journalled on a pair of roller bearings 26 (FIG. 3) and extends along a center axis 28 through a barrel half outer bushing 30 attached to a side of the throttle barrel 16 (FIG. 2). In a preferred embodiment, the barrel outer half bushing 30 is integrally formed with the throttle barrel 16.

As seen in FIG. 2, a throttle cam 32 is attached outside the throttle bore 36 by peening to the end 20' of the shaft 20. The throttle cam 32 has a circumferential groove 38 for receiving one end of a throttle cable 39 (FIG. 4), the other end of which is attached to the accelerator pedal (not shown). Thus, accelerator pedal motion translates through the throttle cable into rotation of the throttle cam 32, which in turn rotates the shaft and the valve plate 24 so that a desired engine operating condition is achieved.

Figure 3:
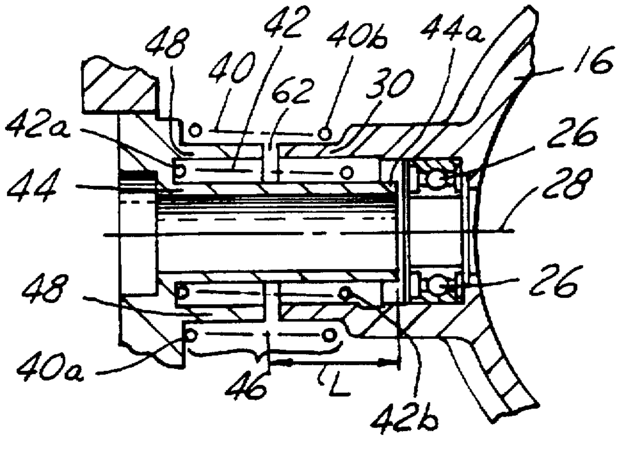
FIG. 3 is a view taken along line 3—3 of FIG. 6.

As shown in FIGS. 2 and 3, an outer torsion return spring 40 and an inner torsion return spring 42 fit concentrically around the shaft 20 between the throttle cam 32 and the throttle barrel 16. The ends of springs 40, 42 are attached to the throttle cam 32 and the throttle barrel 16 to bias the throttle cam 32 to a position in which the valve plate 24 blocks air passage through the throttle barrel 16. Thus, the throttle mechanism is biased to the closed position. The springs 40, 42 are preferably made of steel with a diameter and gauge selected to suit the particular throttle valve and engine.

Still referring to FIG. 3, an inner bushing 44 attached to the throttle cam 32 radially separates the inner spring 42 from the shaft 20. Preferably, the inner bushing 44 is integrally formed with the throttle cam 32 and extends from the throttle cam 32 concentrically into the barrel outer half bushing 30. The length L from the approximate longitudinal center of the inner bushing 44 to the end which extends into the barrel bushing is primarily for alignment purposes during assembly. Since the inner spring 42 will not ride on that end of the inner bushing 44, the length L is not necessary to separate the inner spring 42 from the shaft 20 near the bearing portion.

Figure 4:
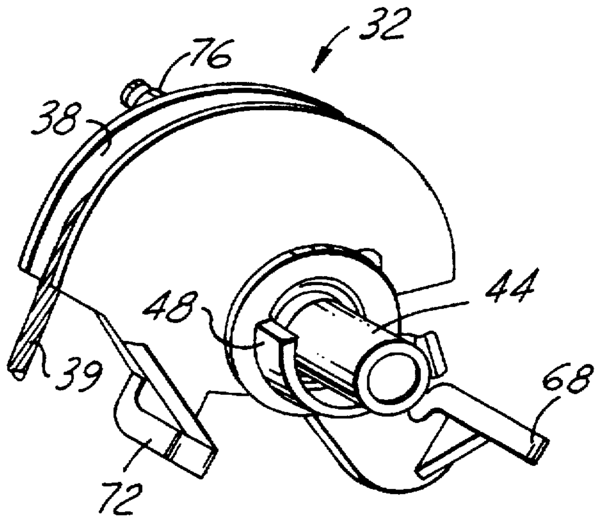
FIG. 4 is a perspective view of a preferred embodiment of a throttle cam having return spring bushings integral therewith.
Figure 5:
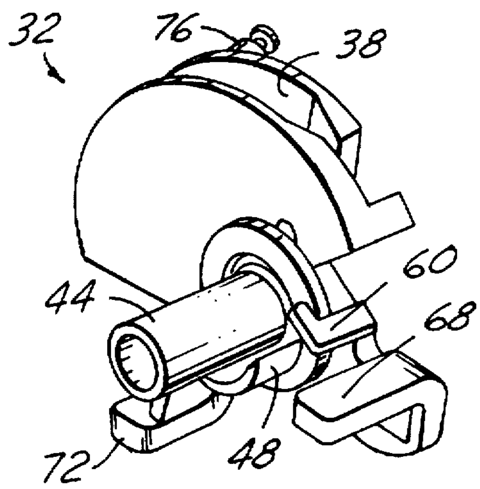
FIG. 5 is a view similar to FIG. 4 but shown from a different perspective.
Figure 10:
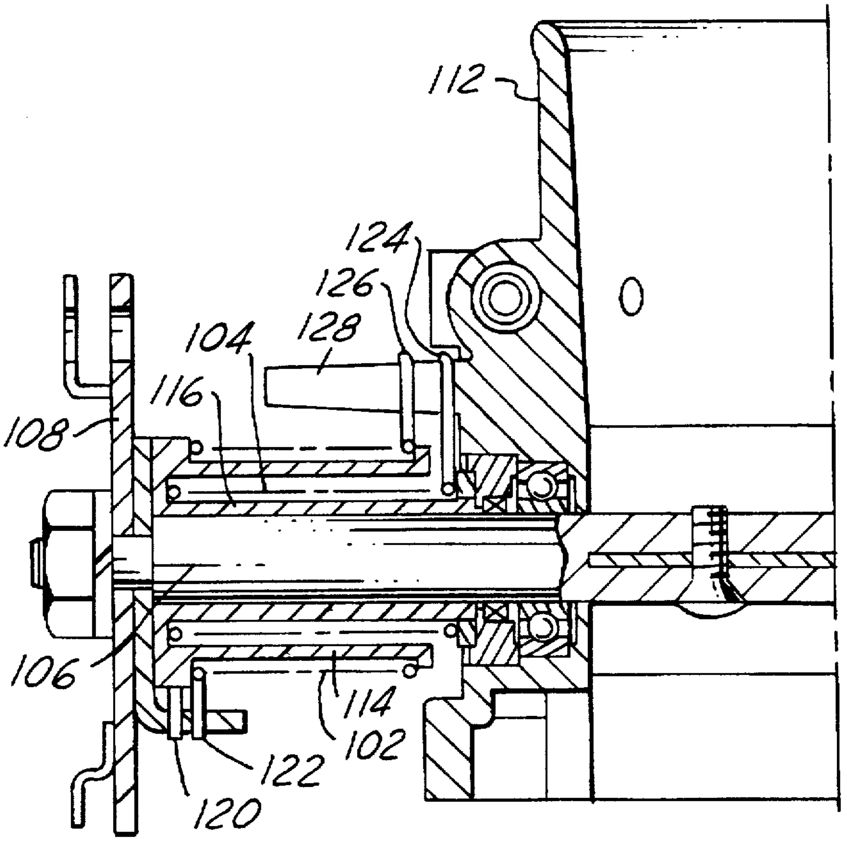
(PRIOR ART) FIG. 10
FIG. 10 is a cross-sectional view of a prior art throttle return device.
Figure 6:
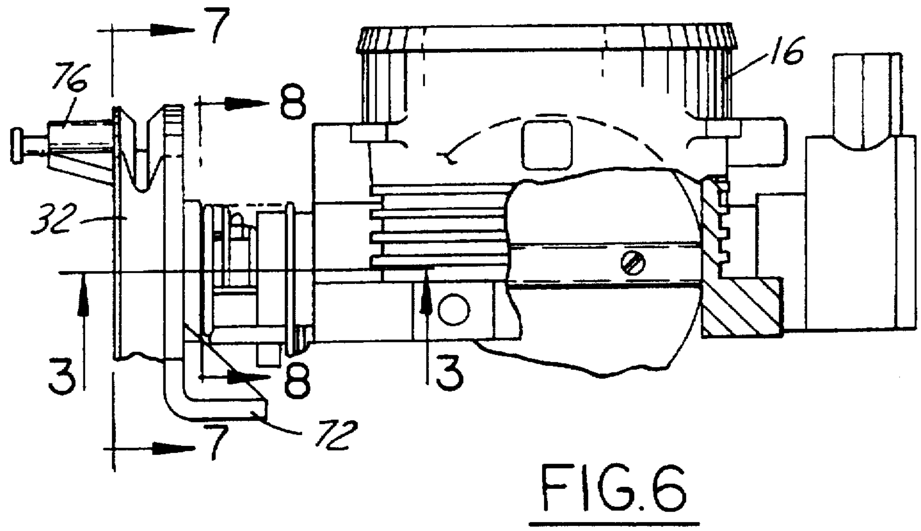
FIG. 6 is a side view of a throttle return mechanism of the present invention with the throttle barrel shown partially cut-away.

Separating the inner spring 42 and the outer spring 40 is an outer bushing 46 (FIG. 3) comprised of a cam outer half bushing 48 projecting from the throttle cam 32 and the barrel outer half bushing 30 which protrudes from the throttle barrel 16. The outer diameter of the inner spring 42 is supported by the inner diameter of the outer bushing 46. A longitudinal slit 50 in the barrel half outer bushing 30 allows the inner spring end 52 to pass therethrough to rest on the land 54 in an extension member 56 of the throttle barrel 16. The other end 58 of the inner spring 42 is coupled to a spring hook 60 on the throttle cam 32 (FIG. 6–9) which is thereby biased to a position in which the valve plate 24 closes the throttle bore 36. The barrel outer half bushing 30 and the cam outer half bushing 48 are preferably separated by a space 62 (FIG. 3) to eliminate rotational friction therebetween. Preferably, the cam outer half bushing 48 is semi-cylindrically shaped, as shown in FIGS. 4–5, since the outer spring 40 only requires support through 180°. Less material is needed to make the cam outer half bushing 48 thereby decreasing manufacturing expense.

The outer spring 40 encircles the outer bushing 46 and has a first end 64 which rests on the land 54 and a second end 66 fitted over the spring hook 60 on the throttle cam 32 (FIGS. 6–9) in a manner similar to the end of the inner spring 42. The outer spring 40 also biases the throttle cam 32 to a position wherein the valve plate 24 is closed.

Those skilled in the art will recognize that the benefits and advantages of the present invention exist in any of several combinations of outer bushing 46 and inner bushing 44 attachment to the throttle cam 32 and throttle barrel 16. For example, either the inner bushing 44 or the outer bushing 46 can be attached as a single piece to either the throttle cam 32 or the throttle barrel 16, but not to both. The bushing which is not a single piece will have a first member attached to the throttle cam 32 and a second member attached to the throttle barrel 16. Such configurations will reduce or eliminate friction between the return springs and the bushings when at least three of the bushing ends are attached to the throttle cam 32 and the throttle barrel 16.

Figure 7:
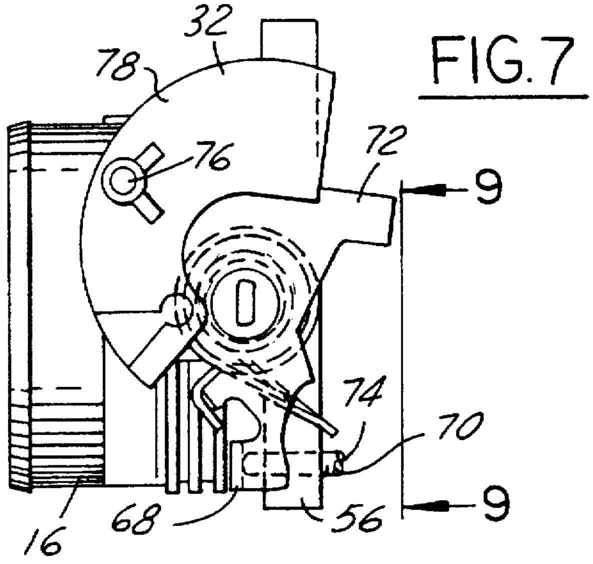
FIG. 7 is a view taken along line 7—7 of FIG. 6.
Figure 9:
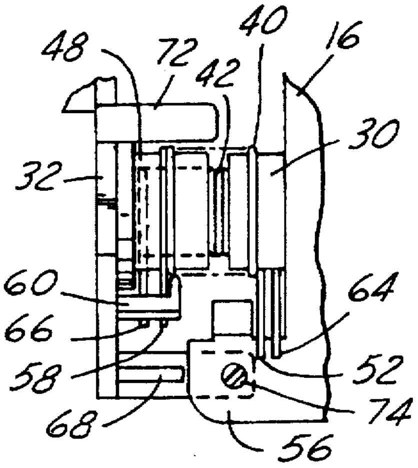
FIG. 9 is a view taken along line 9—9 of FIG. 7.
Figure 8:
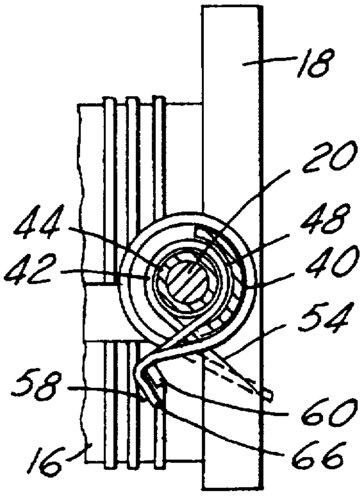
FIG. 8 is a view taken along line 8—8 of FIG. 6.

Considering now FIG. 7, a pair of radially projecting members 68, 72 restrict rotational movement of the throttle cam 32 to limit the valve plate 24 location for engine idle and maximum speeds. An idle stop member 68 is positioned on the throttle cam 32 so as to abut a portion of a screw 70 passing through the extension member 56. Engagement of the idle stop member 68 with the screw 70 opposes rotation of the throttle cam 32 under the force of the springs 40, 42. Engine idle speed can thus be set at the factory and the head (not shown) of the screw 70 broken off to prevent tampering with engine idle speed. A maximum rotation stop 72 abuts the bottom surface of extension 56 to limit rotation of the throttle cam 32 when urged in the clockwise direction, as seen in FIG. 7, by the accelerator cable.

A cruise control nob 76 on an outboard surface of the throttle cam 32 provides an attachment for a cruise control cable (not shown) which automatically controls throttle cam 32 position, and thus engine speed.

In a preferred embodiment, the throttle cam 32, the inner bushing 44, the cam outer half bushing 48, the cruise control nob 76, the idle stop member 68, the maximum rotation stop 72, and the spring hook 60 are integrally formed in a single piece. Such a construction simplifies assembly since the inner bushing 44 and the cam outer half bushing 48 need not be separately attached to the throttle cam 32 before connection to the throttle barrel 16. The throttle cam 32, along with the integrated components mentioned, are preferably made of a fiberglass reinforced thermoplastic, such as polyamide, by injection molding or compression molding.

Further simplifying assembly is integration of the barrel outer half bushing 30 with the throttle barrel 16 so that the barrel outer half bushing 30 need not be separately attached to the throttle barrel 16. The throttle barrel 16, along with the barrel outer half bushing 30, are also preferably made of a fiberglass reinforced thermoplastic, such as polyphenylene sulphide, by die casting or injection molding.

Assembly of the throttle valve return mechanism is accomplished by peening the throttle cam 32 to the shaft 20, and positioning the inner spring 42 around the inner bushing 44 and fastening the end 58 to the spring hook 60. The outer spring 40 is placed around the cam outer half bushing 48 with the end 66 anchored to the spring hook 60. With the springs 40, 42 attached to the throttle cam 32 as described, the end 52 of the inner bushing 44 is located within the barrel outer half bushing 30 so that the end 52 of the inner spring 42 is engaged in the slit 50 to rest on the land 54. The outer spring 40 is fitted around the barrel outer half bushing 30 with the end resting in the land 54 adjacent the end of the inner spring 42. The shaft is then placed through the bearings and into the throttle bore 36 where the valve plate 24 is attached. Those skilled in the art will recognize that other assembly steps will be required, such as installing the shaft bearing 26 and attaching the accelerator and cruise control cables. It should be noted that the throttle return valve mechanism just described requires fewer assembly steps than prior return valve mechanisms primarily due to the integral nature of the throttle cam 32 and the throttle barrel 16 which incorporate the bushings therein.

In operation, the inner spring 42 and the outer spring 40 rotatably bias the throttle cam 32 to the position shown in FIG. 7 such that the valve plate 24 essentially closes the air path through the throttle barrel 16. When the throttle cam 32 rotates, as under the force of the accelerator cable 39 or the cruise control cable, it does so against the torsional force of the springs 40, 42. Ends 66, 58 of springs 40, 42, respectively, which are attached to the throttle cam 32, rotate therewith and portions of the springs 40, 42 may contact the outer and inner bushings, 46, 44, respectively. However, the end portions **40*a* and 40*b* of the outer spring 40 which contact the cam outer half bushing 48 and the barrel outer half bushing 30, respectively, do so at locations where there is little or no relative movement between those end portions and the respective outer half bushings (FIG. 3). Friction between the outer spring 40 and the outer bushing 46** is thus minimized or completely eliminated.

With respect to the inner spring 42, the end portion **42*a* may contact the inner diameter of the cam outer half bushing 48 and the outer diameter of the inner bushing 44. However, since the end 58 of the inner spring 42 is attached to the throttle cam 32, friction between the inner spring 42 and the inner bushing 44 is minimized due to lack of relative movement therebetween. The end portion 42*b* of the inner spring 42 adjacent the shaft bearings 26 partially abuts the inner diameter of the barrel outer half bushing 30, but again, little or no friction is developed due to lack of relative motion therebetween. The clearance between the inner bushing 44 and the outer bushing 46 is such that the end portion 42*b* of the inner spring 42 does not contact the inner bushing 44 when skewed by the reaction torque of the spring preload (FIG. 3**).

Smoother speed adjustment is obtained with the throttle valve return mechanism just described due to minimization of friction between the return springs and the bushings. With lower friction, throttle valve hysteresis is greatly reduced thereby improving vehicle response to operator input.

Although the preferred embodiment of the present invention has been disclosed, various changes and modifications may be made without departing from the scope of the invention as set forth in the appended claims.

We claim:

1. A throttle valve for an air intake manifold of an internal combustion engine, the valve comprising:

a throttle barrel attached to said intake manifold;

a shaft mounted through said barrel perpendicular to a central axis therethrough;

a valve plate mounted to said shaft within said throttle barrel;

a throttle cam connected to said shaft on an outer portion of said throttle barrel;

an outer bushing and an inner bushing mounted concentrically around said shaft between said throttle cam and said throttle barrel such that one of said inner bushing and said outer bushing is attached to one of said throttle cam and said throttle barrel and is not attached to the other of said throttle cam and said throttle barrel, and the other of said inner bushing and said outer bushing has a first member attached to said throttle cam and a second member attached to said throttle barrel;

an outer return spring mounted to said throttle cam and said throttle barrel around an outer surface of said outer bushing; and an inner return spring mounted to said throttle cam and said throttle barrel between said inner bushing and said outer bushing.

2. A throttle valve as defined in claim 1 wherein said inner bushing is attached to said throttle cam and said outer bushing has a first member attached to said throttle cam and a second member attached to said throttle barrel.

3. A throttle valve as defined in claim 2 wherein said first member and said second member are separated by a space.

4. A throttle valve as defined in claim 3 wherein said first member is semi-cylindrically shaped.

5. A throttle valve as defined in claim 4 wherein said second member has a slit therein extending parallel to a central axis through said outer bushing, said slit receiving therein a first inner spring end.

6. A throttle valve as defined in claim 5 wherein said throttle cam has a spring hook thereon which receives a second inner spring end and a second outer spring end thereon.

7. A throttle valve as defined in claim 6 wherein said throttle cam, said inner bushing and said first member of said outer bushing comprise an integral piece.

8. A throttle valve as defined in claim 6 wherein said second member of said outer bushing and said throttle barrel are an integral piece.

9. A throttle valve as defined in claim 1 wherein said throttle cam has an accelerator cable connected thereto for rotating said throttle cam so as to move said valve plate to a desired position.

10. A throttle valve for an air intake manifold of an internal combustion engine, the valve comprising:

a throttle barrel attached to the intake manifold and having a valve plate rotatably mounted on a shaft therein;

a barrel outer half bushing integral with the throttle barrel, the barrel bushing having a slit therein extending parallel to a central axis through the bushing;

a throttle cam connected to the shaft and having an inner spring bushing integral therewith concentric with the shaft, the throttle cam also having a spring hook thereon;

a cam outer half bushing integral with the throttle cam and coaxially aligned with the barrel outer half bushing, the cam outer half bushing and the barrel outer half bushing combining to form an outer bushing;

an outer return spring mounted around an outer surface of the outer bushing, the outer return spring having a first end positioned in the slit and a second end mounted to the spring hook;

an inner return spring mounted between the inner bushing and the outer bushing, the inner return spring having a first inner spring end positioned in a notch and a second inner spring end mounted to the spring hook; and means for rotating the throttle cam to obtain a desired valve plate position.

11. A throttle valve as defined in claim 10 wherein the cam outer half bushing and the barrel outer half bushing are separated by a space.

12. A throttle valve as defined in claim 11 wherein the cam outer half bushing is semi-cylindrically shaped.

13. A throttle valve as defined in claim 12 wherein the throttle cam has an idle stop member and a maximum rotation stop member integral therewith to limit rotation of the throttle cam and the valve plate.

14. A throttle valve as defined in claim 13 wherein the throttle cam has a cruise control nob integral therewith for attachment with a cruise control cable.

15. A throttle valve as defined in claim 10 wherein the means for rotating is an accelerator cable connected to the throttle cam.

16. A mechanism for minimizing rotational friction in an automotive throttle valve having a throttle barrel attached to the intake manifold of an internal combustion engine, the throttle barrel having a shaft mounted through the barrel perpendicular to an axis along the airflow through the barrel and a valve plate mounted to the shaft for rotatable blocking and permitting air passage through the barrel to the intake manifold, the mechanism comprising:

a barrel outer half bushing integral with the throttle barrel, the barrel bushing having a slit therein extending parallel to a central axis through the bushing;

a cam outer half bushing integral with a throttle cam and coaxially aligned with the barrel outer half bushing, the cam outer half bushing and the barrel outer half bushing combining to form an outer bushing;

an outer return spring mounted around an outer surface of the outer bushing, the outer return spring having a first end and a second end, the first end positioned in a notch;

the throttle cam connected to the shaft and having an inner spring bushing integral therewith concentric with the cam outer half bushing and having the shaft extending a long an axis therethrough, the throttle cam also having a spring hook thereon which receives the second end of the outer return spring;

an inner return spring mounted between the inner bushing and the outer spring cam bushing, the inner return spring having a first inner spring end positioned in the slit and a second inner spring end mounted to the spring hook; and means for rotating the throttle cam to obtain a desired valve plate position.

* * * * *